D. MARINSKY.
MACHINE FOR MAKING FASTENING DEVICES.
APPLICATION FILED DEC. 27, 1916.
1,272,981.
Patented July 16, 1918.
8 SHEETS—SHEET 1.
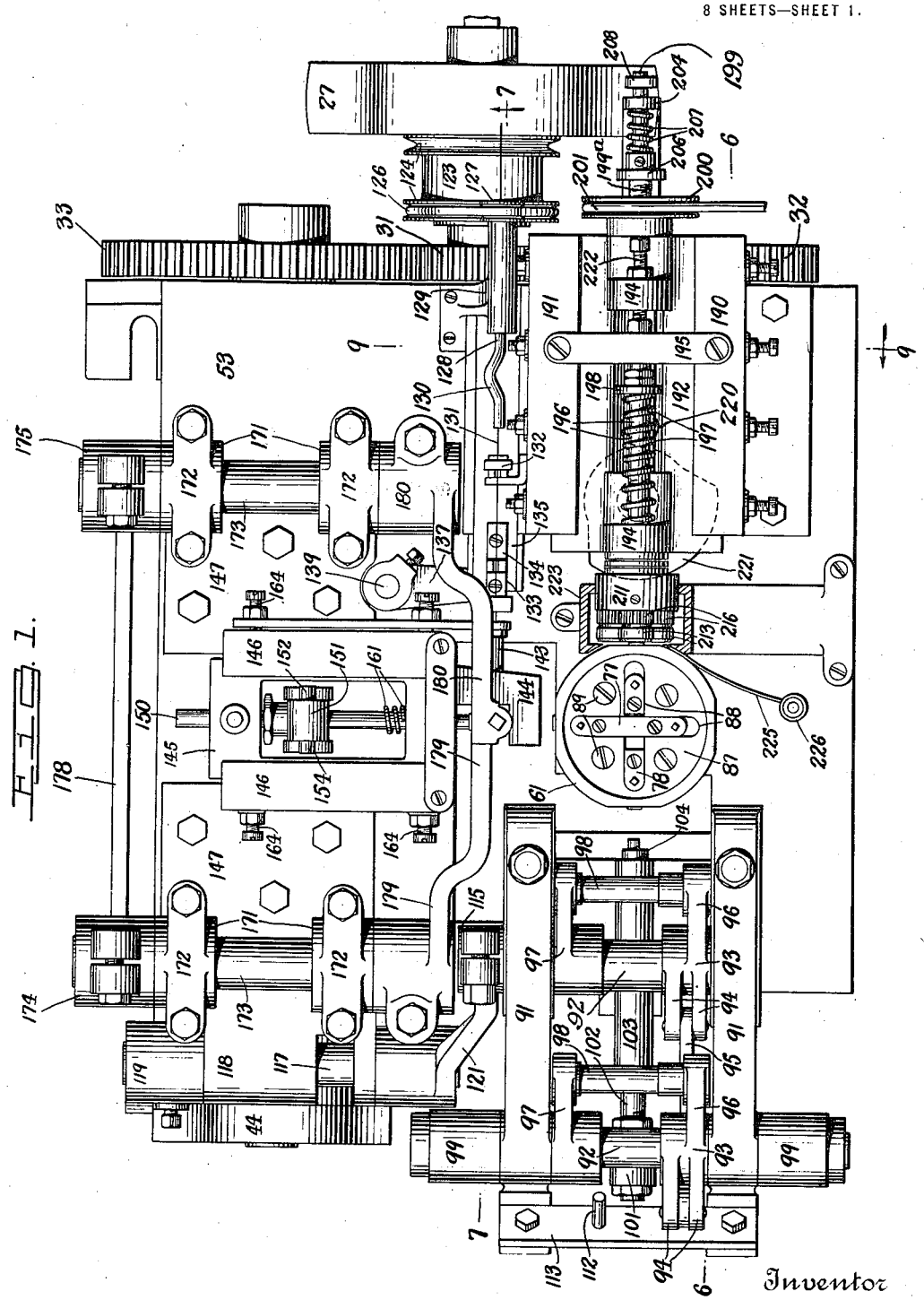
Inventor
Davis Marinsky
By his Attorneys
Edgar Tate & Co.

D. MARINSKY.
MACHINE FOR MAKING FASTENING DEVICES.
APPLICATION FILED DEC. 27, 1916.
1,272,981.
Patented July 16, 1918.
8 SHEETS—SHEET 2.
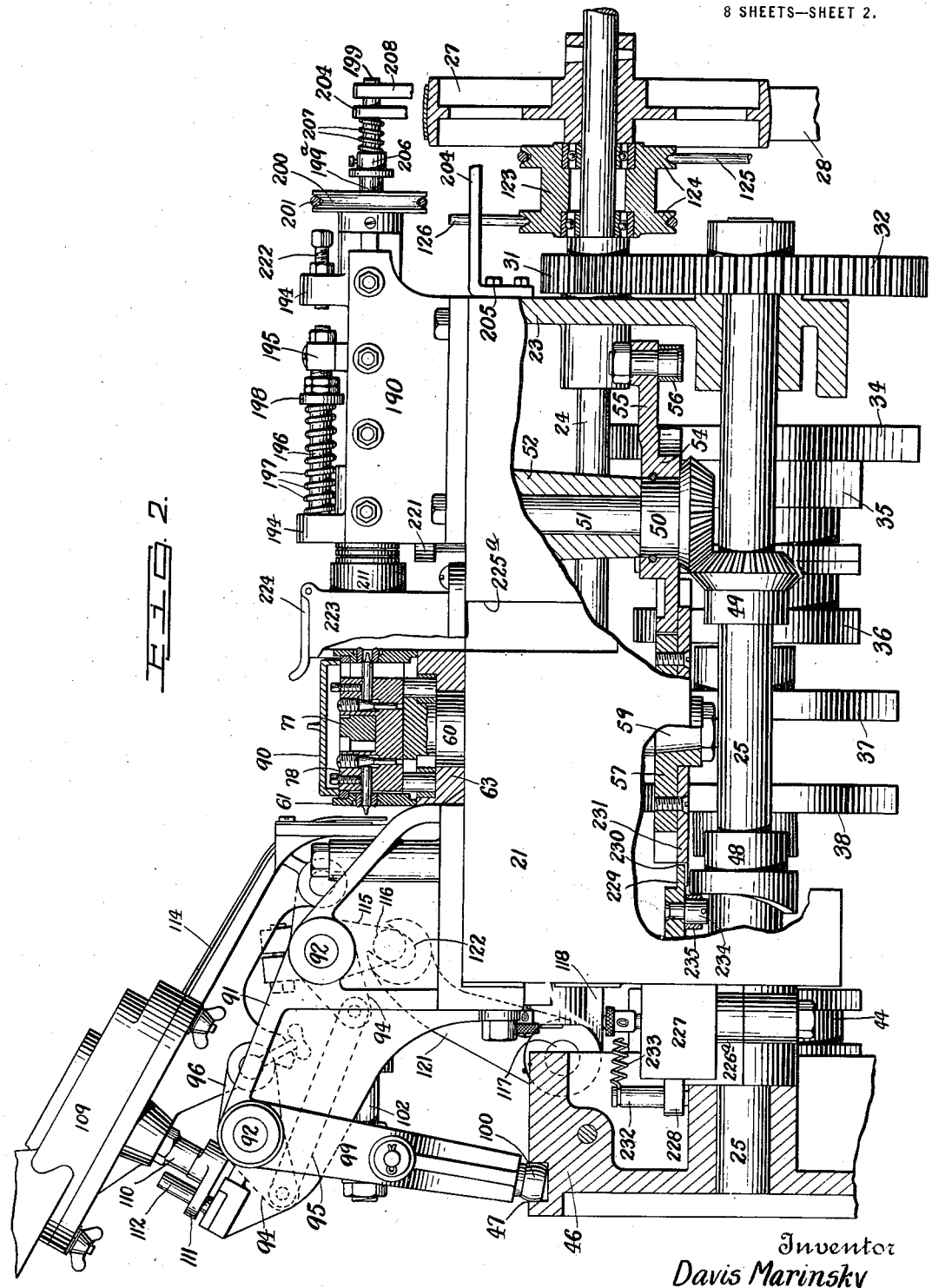
Inventor
Davis Marinsky
By his Attorneys
Edgar Tate & Co D. MARINSKY.
MACHINE FOR MAKING FASTENING DEVICES.
APPLICATION FILED DEC. 27, 1916.
1,272,981.
Patented July 16, 1918.
8 SHEETS—SHEET 3.
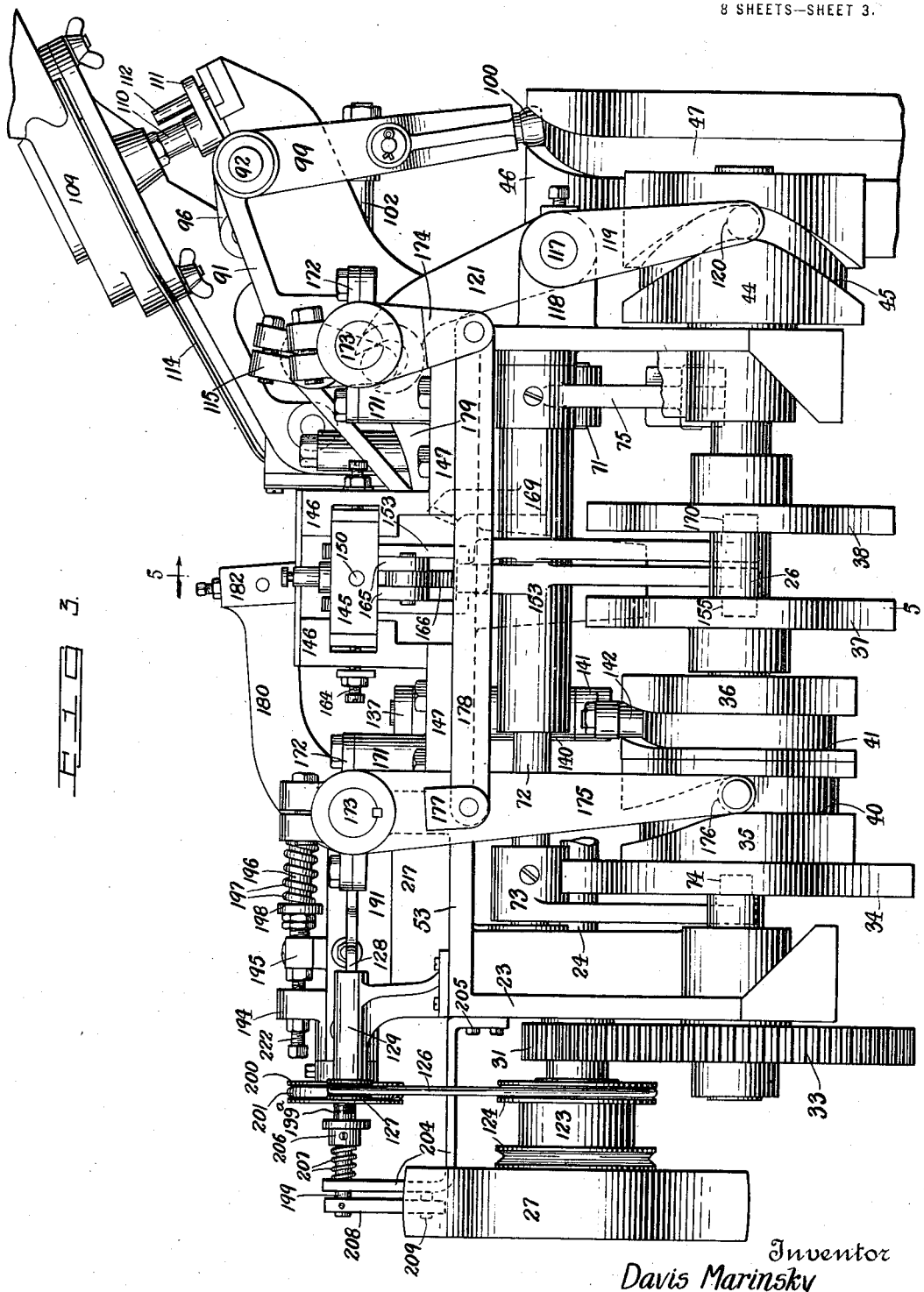
Inventor
Davis Marinsky
By his Attorneys
Edgar Tate & Co.

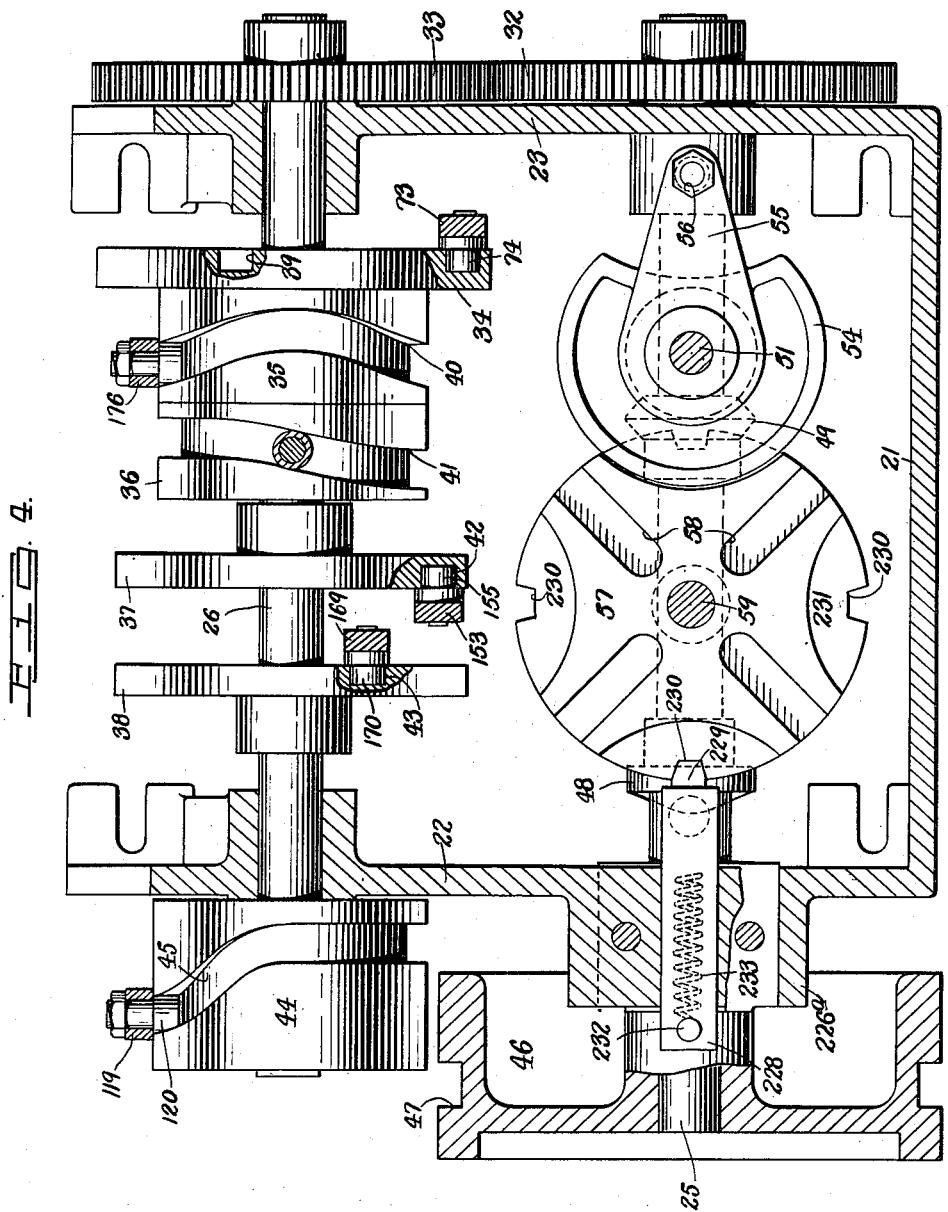

D. MARINSKY.
MACHINE FOR MAKING FASTENING DEVICES.
APPLICATION FILED DEC. 27, 1916.
1,272,981.
Patented July 16, 1918.
8 SHEETS—SHEET 5.
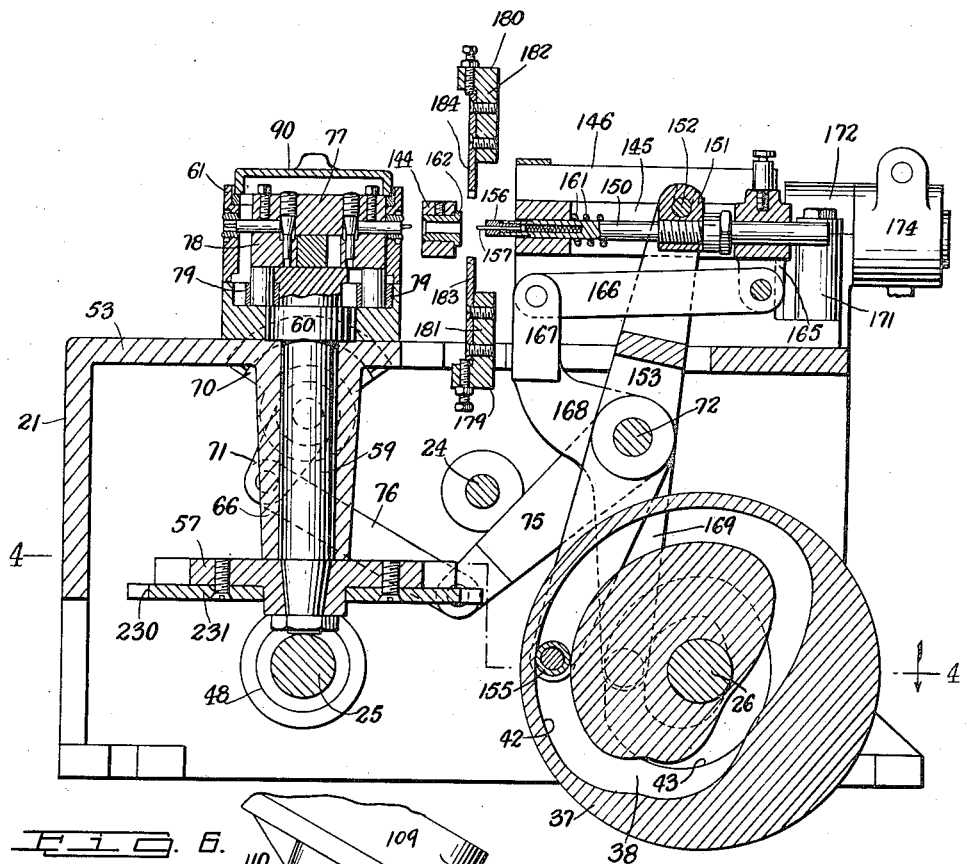
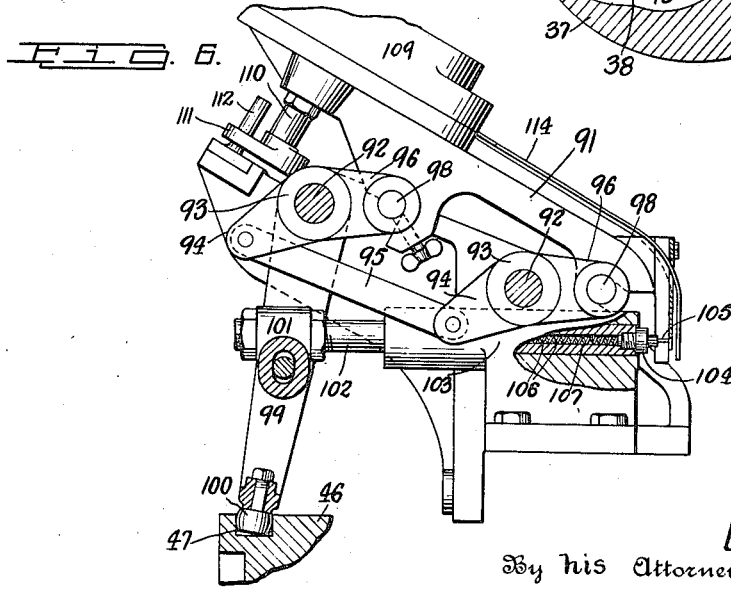
Inventor
Davis Marinsky
By his Attorneys
Edgar Tate & Co.

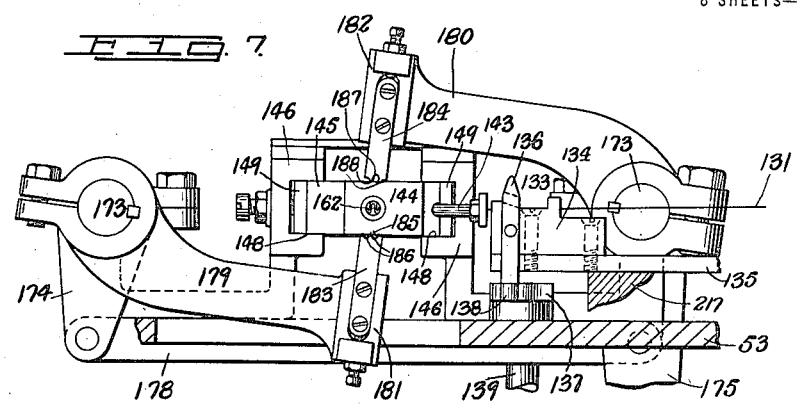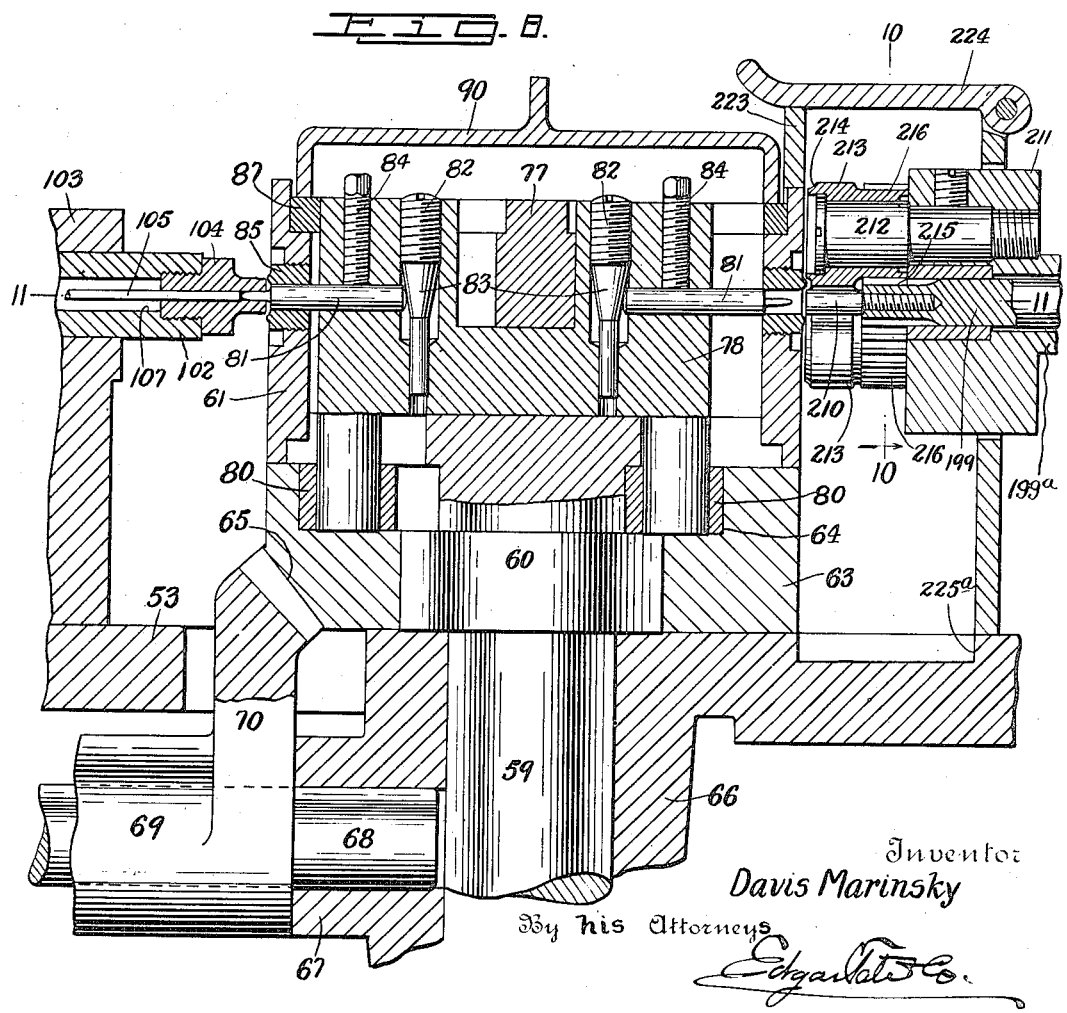

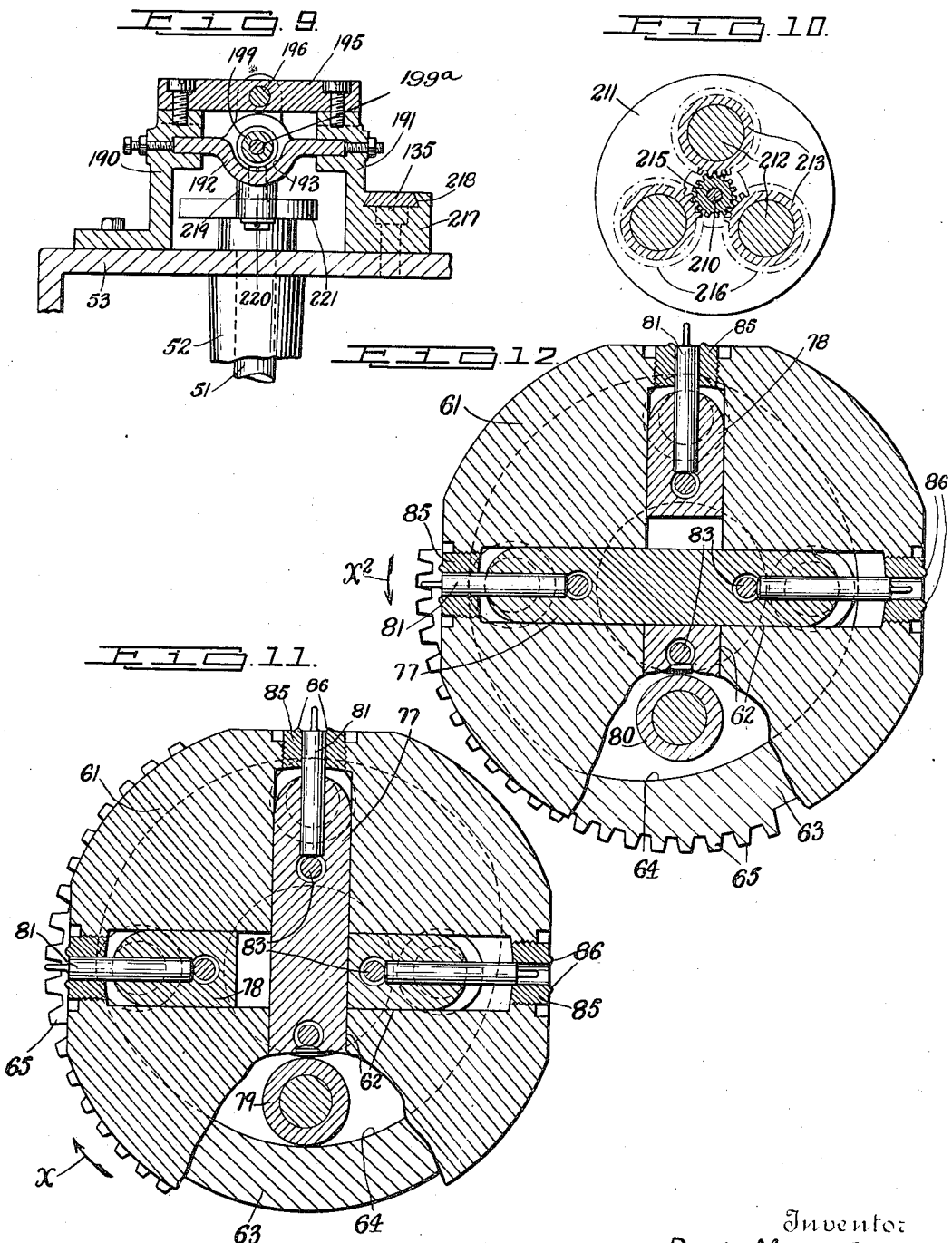

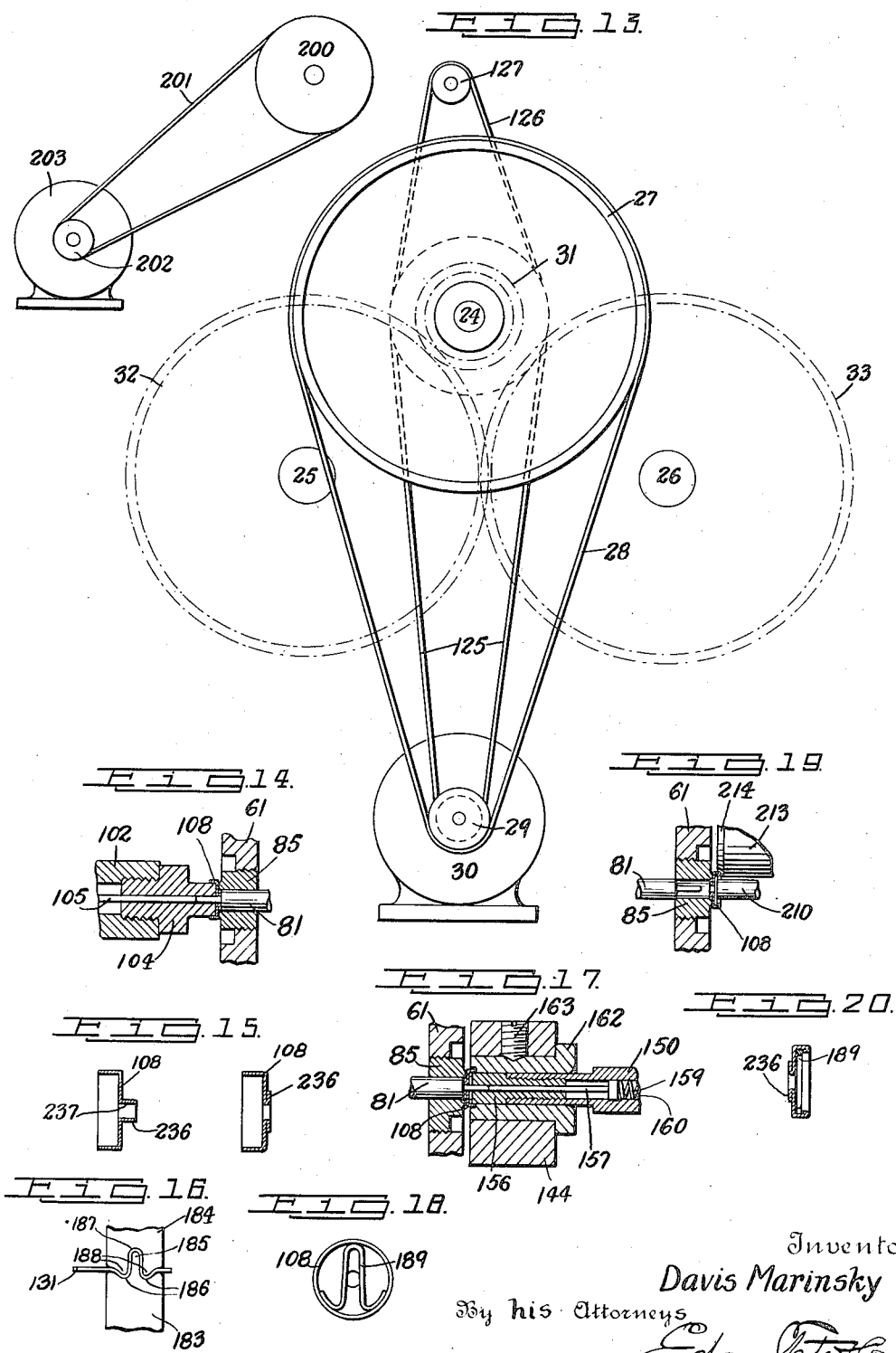

UNITED STATES PATENT OFFICE.

DAVIS MARINSKY, OF NEW YORK, N. Y.

MACHINE FOR MAKING FASTENING DEVICES.

1,272,981. Specification of Letters Patent. Patented July 16, 1918.

Application filed December 27, 1916. Serial No. 139,077.

*To all whom it may concern:*

Be it known that I, DAVIS MARINSKY, a citizen of the United States, and residing at New York, in the county of New York and State of New York, have invented certain new and useful Improvements in Machines for Making Fastening Devices, of which the following is a specification, such as will enable those skilled in the art to which it appertains to make and use the same.

This invention relates to machines for making fastening devices of the ball and socket type, and particularly such fastening devices as are shown and described in U. S. Letters Patent No. 1,196,009 granted to me August 29, 1916; and the object of this invention is to provide a machine particularly designed for use in making the socket member of a fastening device of the class referred to and shown and described in said patent, and whereby the manufacture of such fastening devices, or the cost thereof will be reduced to a minimum and such manufacture facilitated and made more practical.

The invention is fully disclosed in the following specification, of which the accompanying drawings form a part, in which the separate parts of my improvement are designated by suitable reference characters in each of the views, and in which:—

Figure 1 is a plan view of my improved machine with part of the construction omitted and part in section;

Fig. 2 a front view with part of the construction in section and part broken away;

Fig. 3 a rear end view of the machine;

Fig. 4 a partial section on the line 4—4 of Fig. 5 with parts broken away;

Fig. 5 a partial transverse section on the line 5—5 of Fig. 3;

Fig. 6 a partial section on the line 6—6 of Fig. 1 and showing parts broken away;

Fig. 7 a partial section on the line 7—7 of Fig. 1;

Fig. 8 a view similar to Fig. 2 but showing only part of the construction shown in said figure and showing the same on an enlarged scale;

Fig. 9 a partial transverse section on the line 9—9 of Fig. 1;

Fig. 10 a transverse section on the line 10—10 of Fig. 8;

Fig. 11 a partial section on the line 11—11 of Fig. 8 and with part of the construction broken away;

Fig. 12 a view similar to Fig. 11 with a part of the construction in a different position;

Fig. 13 a diagrammatic view of the driving mechanism;

Fig. 14 a sectional view of a detail of my improvement and showing the first step in making the socket member of the fastening device;

Fig. 15 a view showing in section the blank shell from which the socket member of the fastening device is formed, and the result of the first step in forming said socket member of the fastening device;

Fig. 16 a view showing the method of forming the spring which I employ in the socket member of the fastening device;

Fig. 17 a sectional detail view showing the method of inserting the spring formed as shown in Fig. 16 into the socket member shown in Fig. 18;

Fig. 18 a face view of the socket member partly completed with the spring member in position therein;

Fig. 19 a sectional detail view showing the means for completing the socket member by turning the rim of the shell inwardly to secure the spring in place; and, Fig. 20 a transverse section of the socket member of the fastening device.

In the practice of my invention, I provide a strong and substantial main frame, comprising a front transverse frame member 21, and a left side frame member 22 and a right side frame member 23 which may be formed integral, or may consist of separate parts connected in any desired manner.

Mounted centrally and transversely of the frame is a main power shaft 24, and supplemental shafts 25 and 26. Connected with the shaft 24 at the right end thereof is a fly wheel or pulley 27, around which passes a belt 28 mounted on a pulley 29 on the shaft of an electric motor 30 whereby said shaft 24 is rotated.

Mounted on the shaft 24 between the frame member 23 and the fly wheel or pulley 27 is a pinion 31 which meshes with a gear 32 mounted on the shaft 25, and mounted on the shaft 26 is a gear 33 similar to and adapted to mesh with the gear 32 on the shaft 25 and by means of this construction the rotation of the main shaft 24 will rotate the shafts 25 and 26.

Secured to the shaft 26 within the frame members 22 and 23 is a series of cam members 34, 35, 36, 37 and 38 having cam grooves 39, 40, 41, 42, and 43 respectively, and secured to the shaft 26 outwardly of the side frame member 22 is another cam member 44 having a cam groove 45.

Secured to the shaft 25 outwardly of the frame member 22 is a large cam member 46 having a cam groove 47, and inwardly of said frame member 22 the shaft 25 is provided with a cam member 48, and secured centrally of the shaft 25 is a beveled gear 49 which is adapted to mesh with a corresponding gear 50 secured to a vertically arranged shaft 51 mounted in a vertical bearing member 52 integral with a top plate 53 of the main frame.

Secured to the hub portion of the gear 50 is a rotary member 54 having an arm 55, to the end of which is secured an anti-friction roller 56 adapted to operate in connection with a slotted disk 57 having a plurality of radial slots or apertures 58, and by means of this construction said disk 57 is given an intermittent rotary movement.

The disk 57 is secured to the lower end of a vertical shaft 59 which passes upwardly and through the top plate 53 of the frame and is provided with an enlarged collar 60 above which the shaft 59 is provided with an integral cylindrical casing 61, the construction of which is clearly shown in Figs. 5, 8, 11 and 12. The casing 61 is cut out to form a plurality of deep, vertical and radial passages 62, and rotatably mounted on the enlarged collar 60 of the shaft 59 is a rotary oscillatory cam member 63 having an upwardly directed cam groove 64, and one side portion of the cam member 63 is provided with a beveled gear segment 65.

The vertical shaft 59 is mounted in a vertical bearing 66 integral with the top plate 53 of the frame, and the top portion of said bearing member is provided with a boss 67 in which and the side frame member 22 is mounted a stub shaft 68, on which is rotatably mounted a sleeve 69, the inner end of which is provided with a segment gear 70, and the outer end of which is provided with a forked arm 71, this construction being clearly shown in Figs. 3, 5 and 8. A supplemental shaft 72 is mounted transversely of the frame above the shaft 26 and secured to said shaft at the right end thereof is an arm 73, the end of which is provided with an anti-friction roller 74 adapted to operate in the cam groove 39 of the cam member 34, and secured to the shaft 72' at the left end thereof is a forwardly directed forked arm 75, in the fork of which is pivoted a link 76, which is also pivoted to the forked arm 71 on the sleeve 69, and by means of this construction which is most clearly shown in Figs. 5 and 8, the rotary oscillatory cam 63 is operated.

Mounted in the radial passages 62 are two U-shaped blocks 77 and 78, the block 77 being directed downwardly, and the ends of which are provided with anti-friction rollers 79 which operate in the cam groove 64 in the cam 63, and the bottom of the U-shaped block 78 is provided in the end portions thereof with downwardly directed fingers having anti-friction rollers 80 which also operate in the cam groove 64.

Mounted in the U-shaped blocks 77 and 78 centrally thereof are oppositely arranged finger pins 81 which are made adjustable therein by means of vertically arranged screws 82 having beveled faces 83, and are locked in the desired position of adjustment by set screws 84, this construction being clearly shown in Figs. 2, 5, 8, 11 and 12. The finger pins 81 pass through and operate in plugs 85 secured to the casing 61 on the top of the vertical shaft 59, the outer faces of the plugs 85 being provided with convex annular beads 86, as clearly shown in said figures.

Mounted in and secured to the top of the casing 61 is a cap plate 87 having radial slots or apertures 88 which correspond with the radial spaces 62 in the casing 61, said cap plate being secured to the casing 61 by means of screws 89, as clearly shown in Fig. 1 of the drawing, and the top portion of the casing 61 including the cap plate 87 is inclosed by a detachable cover 90, which serves to keep dust, dirt and the like from entering the mechanisms inclosed therein, and the operation of the U-shaped blocks 77 and 78 with the finger pins 81 mounted therein will be hereinafter described.

Secured to the left side of the casing 61 and ranging upwardly are two similar standards 91 in which are mounted shafts 92 which range forwardly and backwardly, and mounted on said shafts between the standards 91 are front levers 93 having forked ends 94 connected by a link 95 and oppositely arranged arms 96, and mounted on said shafts rearwardly of the levers 93 are arms 97, and mounted in the ends of the arms 97 and 96 are pins or bars 98. The ends of the shaft 92 farthest to the left protrude beyond the standards 91, and rotatably mounted thereon is a yoke-shaped arm 99 the lower end of which is provided with an anti-friction roller 100 adapted to operate in the cam groove 47 in the cam member 46.

The central portion of the yoke-shaped arm 99 is provided with a raised boss 101 in which is secured a rod 102, which is slidably mounted in a sleeve bearing block 103 secured to the top plate of the frame between the supplemental standards 91, as clearly shown in Figs. 1 and 6.

Secured to the inner end of the rod 102 is a plug 104 in which is slidably mounted a headed pin 105 normally forced outwardly by a spring 106 mounted in a recessed portion 107 in the rod 102, as clearly shown in Figs. 6 and 8, and as will be understood the forked arm 99 operated by the cam 46 serves to move the rod 102 inwardly and the pin 105 is adapted to grasp a shell, such as shown at 108 at the left of Fig. 15 of the drawing, as hereinafter described.

Detachably mounted on the pins or bars 98 is a race member 109 of the usual or any preferred construction into which are fed shells such as shown at 108 in Fig. 15 to be fed into the desired position, as hereinafter described, and the central shaft 110 of the race member is provided with a forked arm 111 adapted to operate in connection with a pin 112 secured to a cross plate member 113 connecting the top portions of the standards 91, and by means of this construction the shaft 110 of the race member is given a rotary oscillatory movement in the usual manner, it being understood that the shells 108 are fed downwardly and guided by the usual guide members or runways 114.

The inner shaft 92 protrudes beyond the inner standard 91, and secured on said protruding end is an arm 115, the end of which is provided with a roller 116, this construction being clearly indicated in dotted lines in Fig. 2, and a stub shaft 117 is mounted in a bearing 118 integral with the side frame member 22, and mounted on the rear end of said shaft is an arm 119 the end of which is provided with an anti-friction roller 120 adapted to operate in the cam groove 45 in the cam member 44. Secured to the front end of the shaft 117 is another arm 121, the end of which is forked as shown at 122 in Fig. 2 of the drawing, and adapted to operate in connection with the roller 116 on the arm 115, and by means of this construction the race member 109 is moved upwardly and downwardly into the position shown in Fig. 2, by the oscillation of the arms 119, 121 and 115 as well as the forked ends 94 of the levers 93 and the links 95 connecting the same.

Rotatably mounted on the left end of the main power shaft 24 is a sleeve 123 having two annularly grooved members 124, and a belt 125 is connected with one of said grooved members and with a correspondingly grooved wheel on the shaft of the motor 30, whereby said sleeve member 123 is rotated, and mounted on the other grooved member 124 is a belt 126 which also passes over and around a grooved wheel 127 secured to the end of a tubular shaft 128 mounted in a suitable bearing 129, secured to the top 53 of the frame and the inner end of the shaft 128 is provided with an offset portion 130, and an endless wire 131 is adapted to pass through the tubular shaft 128, and through a guide member 132 and be fed into the machine by a feed mechanism 133 of the usual or any preferred construction and, in the form of construction shown, said feed mechanism consists of a block 134 secured to a slide 135, a forked member 136 pivoted to the block 134, the slide and block being movable by an arm 137 forked to engage a pin 138 at the lower end of the forked member 136, whereby when said block and slide 134 and 135 is moved forwardly by the arm 137 engaging the pin 138, the forked member 136 grasps the wire 131 between it and the block 134.

The arm 137 is secured to a vertical shaft 139 which passes downwardly through the top member 53 of the frame or casing and through a bearing 140 integral with said top and secured to the lower end of said shaft is another arm 141, the end of which is provided with an antifriction roller 142 adapted to operate in the cam groove 41 of the cam member 36, this construction being clearly shown in Figs. 1, 3 and 7 of the drawing.

The wire 131 is fed through a guide tube or sleeve 143 into the yoke-shaped end 144 of a carriage 145. The carriage 145 is mounted in parallel slideways 146 which range forwardly and backwardly and are connected with the top plate 53 of the frame or casing by plates 147 integral therewith, as clearly shown in Figs. 1, 5 and 7 of the drawing.

The slideways 146 are provided on their inner faces with grooves 148 in which the side portions of the carriage 145 operate, and adjustable bearing plates 149 are mounted between the side members of the carriage 145 and the inner face of the grooves 148, whereby the carriage 145 may be properly centered with the rotary casing 61 of the shaft 59.

Slidably mounted in the carriage 145 centrally thereof is a rod 150 to the central portion of which is secured a block 151, in which is secured a pin 152, the ends of which protrude beyond said block, and a lever 153 is mounted on the shaft 72 and the upper end of said lever is forked to engage the protruding ends of the pin 152, as clearly shown at 154 in Fig. 1 of the drawing, and the lower end of said lever is provided with an anti-friction roller 155 adapted to operate in the cam groove 42 and the cam member 37.

A tubular plug 156 is secured to the inner end of the rod 150, and slidably mounted in said plug is a headed pin 157 normally forced outwardly by a spring 159 mounted in a bore 160 in the inner end of the rod 150, as clearly shown in Figs. 5 and 17 of the drawing, and a spring 161 is mounted on the inner end of the rod 150, and in connection with which the block 151 is adapted to operate in the inward movement of the rod as hereinafter described.

A die block 162 is secured in the forked end 144 of the carriage 145 as clearly shown in Figs. 5 and 17 of the drawing by means of a set screw 163 and through which the bent wire forming the spring is passed by means of the rod 150, as clearly indicated in Figs. 5 and 17 of the drawing, to insert the spring into the socket member as hereinafter described. It will be noted that the carriage 145 is adjustably mounted in the slideways 146 by means of screws 164.

The outer end of the carriage 145 is provided with depending forked members 165 with which is connected a link 166, which is also connected with the forked end 167 of a lever 168 mounted on the shaft 72. The lever 168 is provided with an arm 169 the end of which is provided with an anti-friction roller 170 which is adapted to operate in the cam groove 43 in the cam member 38 as clearly shown in Figs. 4 and 5 of the drawing, and by means of this construction the cam member 38 operates the lever 168 to move the carriage 145 inwardly, while the lever 153 is operated by the cam member 37 to move the rod 150 inwardly, as hereinafter described.

Formed integral with the plates 147 are upwardly directed bearings 171 having caps 172, and mounted in said bearings are shafts 173 which range forwardly and backwardly, and connected with the rear ends of said shafts are depending arms 174 and 175, the arm 175 being longer than the arm 174, and the lower end thereof being provided with an anti-friction roller 176 which is adapted to operate in the cam groove 40 of the cam member 35. The arm 175 is provided with an ear member 177 with which is connected a link 178 which is also connected with the lower end of the arm 174, as clearly shown in Figs. 1 and 3 of the drawing, and by means of the cam member 35 said arms are oscillated to oscillate the shafts 173 as will be readily understood.

Mounted on the front ends of the shafts 173 are inwardly directed arms 179 and 180, the inner ends of which overlap, the arm 180 being above the arm 179, as clearly shown in Figs. 5 and 7 of the drawing. The ends of the arms 179 and 180 are enlarged to form heads 181 and 182, and mounted in said heads are spring forming dies 183 and 184, the die 183 being provided with a central raised member 185, the opposite sides of which are recessed as shown at 186, while the end of the die 184 is provided with a central recess 187 on the opposite sides of which are projecting members 188, this construction being clearly shown in Figs. 7 and 16 of the drawing, in which latter figure the dies 183 and 184 are shown in their operative position, or in the position in which said dies bend the wire 131 fed therebetween into the form of a U-shaped spring as clearly shown in said figure.

After the wire 131 has been bent to form a U-shaped spring the same is engaged or caught by the inner end of the rod 150 and fed through the die block 162, which operation shears off the ends of said bent spring to form a spring member 189 which is fed into the socket as clearly shown in Figs. 17 and 18, and in this operation the rod and die block serve to support the spring member 189.

Secured to the top 135 of the frame to the right thereof are supplemental slideways 190 and 191 in which is mounted a carriage 192, the central portion of which is concavo-convex in form as shown at 193 in Fig. 9 of the drawing, and the ends of the carriage 192 are provided with raised bearing members 194. Secured to the top of the slideways 190 and 191 approximately centrally thereof is a cross bar 195 in which is secured a rod 196 which passes inwardly, and the inner end of which is free to pass through the inner bearing member 194 of the carriage 192 and a coil spring 197 is mounted on said rod between the inner bearing 194 and a collar 198 adjustably mounted on said rod, to regulate the tension of the spring 197 and the carriage 192 is normally held inwardly by the spring 197.

Mounted in the carriage 192 centrally thereof and below the rod 196 is a tubular shaft 199$^a$ to the outer end of which is secured a grooved wheel 200 around which is passed a belt 201 which also passes around a similar wheel 202 mounted on the shaft of a supplemental motor 203, as clearly indicated in Fig. 13 of the drawing, and with this construction the shaft 199$^a$ is rotated continuously by a separate motor. The shaft 199$^a$ is so mounted in the carriage 192 as to be moved in and out with the carriage. Mounted in the shaft 199$^a$ is a supplemental shaft 199 which is supported by an L-shaped support 204 which is secured to the side frame member 23 as indicated at 205 in Figs. 2 and 3 of the drawing, and mounted on the shaft 199 between the L-shaped support 204 and the grooved wheel 200 is an adjustable collar 206, between which and the L-shaped support is placed a spiral spring 207 which serves to normally force the shaft 199 inwardly and secured to the shaft 199 outwardly of the L-shaped support 204 is a depending rod 208, the lower end of which is provided with an opening adapted to coöperate with a pin 209 secured to the L-shaped support, which pin projects through said opening, as clearly indicated in Fig. 3 of the drawing, and by means of this construction in the forward and backward movement of the shaft 199 rod 208 slides back and forth on pin 209 and the shaft 199 thereby is held against rotation.

Mounted in the inner end of the shaft 199 is a finger pin 210 which operates in connection with the socket members, as hereinafter described. The inner end of the shaft 199ª is provided with an enlarged disk 211 in which is mounted a plurality of pins 212 which are three in number in the construction shown and rotatably mounted on the inner ends of said pins are tubular spinning tools 213, the corner portions of which are recessed as shown at 214, and the recessed portions of said spinning tools are of such form and construction that the operation of said spinning tools in connection with the edge portion of the rim of the socket member 108 will bend or turn said edge portion inwardly upon itself to secure the spring 189 therein, in the operation of said tools, and as clearly indicated in Figs. 19 and 20 of the drawing. The operation of bending or turning the rim inwardly is accomplished by the rotation of said spinning tools around said rim, the rotation of said spinning tools and the inward movement of the shaft 199ª and said tools mounted thereon; or in other words the inward movement of said tools when rotating and their rotation around the rim of said socket member bends or turns said rim inwardly upon itself as above described, the extent of this spinning or turning operation being controlled or governed by the shape, depth or curvature of the groove 214 in the face of said spinning tools.

The inner end of the shaft 199 is provided with a pinion 215 and the inner ends of the spinning tools 213 are provided with gears 216 which are adapted to mesh with the pinion 215, whereby on the rotation of the shaft 199ª by the motor 203 the spinning tools 213 are rotated by reason of their connection with the pinion 215 on the end of the shaft 199 which is held against rotation and the rotation of the spinning tools 213 will turn the rim of the socket member 108 inwardly, and by employing a separate motor for producing this result the same may be more practically accomplished, although it will be understood that the shaft 199ª may be driven by a belt or gear construction connected with the shaft of the motor 30.

The base of the slideways 191 is enlarged as shown at 217, and the top portion thereof is provided with a recessed groove 218 which extends the full length thereof, and in which the slide 135 operates, as clearly shown in Fig. 9.

The central portion of the carriage 192 is provided with a depending stud 219 in which is mounted an antifriction roller 220, and mounted on the upper end of the shaft 51 is a cam member 221 in connection with which the roller 220 operates, and by the rotation of this cam the carriage 192 is moved outwardly against the tension of the spring 197 bringing with it shaft 199 and thereby moving said spinning tools 213 out of operative position or out of engagement with the shells 108 as hereinafter described.

Adjustably mounted in the outer bearing member 194 of the carriage 192 is a stop screw 222 which serves to limit the inward movement of the carriage 192.

The spinning tools on the inner end of the shaft 199ª are inclosed by a casing 223 secured to the top of the frame and provided with a hinged cover 224 and a spring finger 225 is secured to the top 53 of the frame at 226 and operates in connection with the outer side of the casing 61 in line with the pins 81 and plugs 85 within the casing 223 and serves to detach the socket members from said plugs and the casing 223 prevents the scattering of the socket members when detached and permits them to drop down through an aperture 225ª in the top 53 of the frame which aperture opens outwardly through the front frame member 21, as clearly shown in Fig. 2.

The shaft 25 passes through a bearing 226ª at the left of the machine, the top of said bearing being enlarged as shown at 227 and slidably mounted in said enlarged portion is a lock bar 228, the inner end of which is provided with an angular projection 229 adapted to operate in connection with angular recesses 230 in an annular disk 231, secured to the bottom of the slotted disk 57 to lock the same against rotation as hereinafter described. The outer end of the bar 228 is provided with a vertical pin 232 with which is connected a coil spring 233 which is secured to a part of the frame, said spring serving to move the bar 228 inwardly into its operative position. The inner end of the bar 228 is provided with a downwardly directed pin 234 on which is mounted an antifriction roller 235 which operates in connection with the cam member 48, said cam member serving to move the bar 228 outwardly or into its inoperative position, as hereinafter described.

The operation of my improved machine will be readily understood from the foregoing description and the following statement. The race 109 is first filled, or approximately filled, with shells similar to that shown at 108 in Fig. 15, said shells being fed down into line with the headed pin 105 and finger pin 81 by the oscillation of the shaft 110 of the race in the usual manner, and the operation of the machine considering the forming of one complete socket member from the point at which it is fed into the machine will be as follows: The race 109 is first moved outwardly into the position shown in Figs. 2, 3 and 6 by the cam member 44 which operates the arms 119, 121 and 115 as hereinbefore set out, after which the rod 102 and headed pin 105 are moved inwardly by the cam member 46 which operates the arm 99 and in this operation of said rod the pin 105 grasps one of the shells 108 in the lower end of the race and places it on the protruding finger pin 81 in the casing 61, this operation also serving to compress the neck portion 236 of said shell as indicated in Figs. 14 and 15. The casing 61 on the top of the shaft 59 with the U-shaped blocks 77 and 78 therein are now in the position shown in Fig. 11, the next step in the operation of the machine will be the rotation of said casing with the cam 63 at the lower end thereof in the direction of the arrow $x$ in Fig. 11 to the extent of 90°, the casing 61 being rotated by the engagement of the roller 56 on the arm 55 with the slotted disk 57, while the cam 63 is rotated to the above extent by the gear segment 70 operated by the cam member 34, as hereinbefore set out, and during the rotation of the casing 61 and cam 63, as above set out, the lock bar 228 is moved outwardly by the cam 48 and inwardly by the spring 233 at the end of said operation to lock the casing 61 against movement.

The above operation brings the shell supported by the finger pin 81 into line with the rod 150, as will be readily understood, and immediately after the casing 61 and cam 63 have been moved into the position above set out the cam 63 is moved backwardly in the direction indicated by the arrow $x^2$ in Fig. 12 into the position shown in said figure, and it will be noted that this operation of the cam does not withdraw the finger pins 81 that are in line with the rods 102 and 150.

The wire 131 from a coil is then fed into the machine by means of the guide and feed mechanisms 128, 132 and 133 into position to permit the dies 183 and 184 to operate thereon to form the U-shaped spring 189, as hereinbefore set out, after which the rod 150 is moved inwardly by the cam member 37 to pass said spring through the die block 162 to shear off the ends thereof, the carriage 145 being moved inwardly in advance of the inward movement of the rod 150 by the cam member 38 and said spring completely formed is placed in the shell supported by the finger pin 81 in line therewith.

The casing 61 with the cam 63 are again rotated in the direction of the arrow $x$ of Fig. 11 to bring the pin 81 in line with the spinning tools 213, or the shaft 199$^a$ in which operation the lock bar 128 is again moved outwardly and inwardly, and immediately after the casing 61 has been locked in the last named position the cam 63 again moves backwardly in the direction of the arrow $x^2$, which operation moves the pin 81 in line with the shaft 199$^a$ inwardly into the position shown in Figs. 8 and 12 at which time the shaft 199$^a$ with the spinning tools 213 thereon are moved inwardly by the carriage 192 which is moved inwardly by the spring 197, and the rotation of the spinning tools will bend the rim of the shell 108 inwardly to secure the spring 189 in said shell and form the socket member complete, as shown in Figs. 19 and 20, after which the cam member 221 acts on anti-friction roller 220 to move said carriage outwardly thereby moving said spinning tools out of operative position.

The casing 61 and cam 63 are again rotated in the direction of the arrow $x$ to the extent of 90° which directs the pin 81 forwardly and in the above operation the spring finger 225 operates to detach the socket member from the plug 86 in the casing 61 and another operation of said casing and cam will bring said pin into the first named position, or in line with the rod 102.

As stated, the above described operation covers the production of one socket member from the first to the last step, but it will be understood that when the machine is running or in operation, and when the rotary casing 61 is held against movement, three independent operations are performed on three different shells or workpieces supported thereby. First, the placing of a shell or workpiece on a finger pin 81. Second, the forming of and inserting of a spring into a shell. Third, spinning the flange of a shell to secure the spring therein.

The cam 63 operates the U-shaped blocks 77 and 78 to keep the finger pins 81 in line with the rods 102 and 150 always projecting from the casing 61, and the other pins 81 within the casing 61 as clearly indicated in Figs. 11 and 12 of the drawing. It will be noted that the cam 63 makes four forward movements and four backward movements in one complete revolution of the casing 61 in order to accomplish the above result.

In the operation of the spinning tools 213, the socket member supported by the plug 85 in line with said tools is held against movement by the pin 210 on the end of the supplemental shaft 199.

It will be understood that the U-shaped spring 189 constitutes the lock spring in connection with which the ball member of the fastening device, not shown and described, operates, as in the patent hereinbefore referred to, and in the use of the complete fastening device the knob or head of the ball member passes through the central aperture 237 and the neck 236 of the shell 108 serves, before it is crimped or compressed as shown at the right of Fig. 15, to guide the shell or shells through the race and hold said shell or shells in the necessary position.

In the accompanying drawings and the foregoing description I have shown and described what I consider the preferred form of my improved machine at the present time, but it must be understood that my invention is not limited to the details of construction herein shown and described, and changes therein and modifications thereof may be made, within the scope of the appended claims, without departing from the spirit of the invention or sacrificing its advantages.

Having fully described my invention what I claim as new and desire to secure by Letters Patent, is:—

1. In a machine for manufacturing socket members of the class described, said socket members comprising originally a shell, an intermittently rotated member, means for operating said member, means mounted in said member for supporting a shell, means for supplying shells to the machine, means for feeding a shell from said supplying means to said supporting means, means for inserting a spring into said shell, and means for securing the spring in said shell.

2. In a machine for manufacturing socket members of the class described, said socket members comprising originally a shell, a rotary member, means for giving said member an intermittent rotary movement, a race member adapted to supply shells to the machine, means in said member for supporting said shells, means for feeding said shells from said race member to the supporting means in said rotary member, means for feeding wire into the machine, means for bending said wire to form a U-shaped spring, means for feeding said spring into a shell supported by said rotary member, and means for securing said spring in said shell.

3. In a machine for manufacturing the socket members of a fastening device of the ball and socket type, said socket members comprising originally a shell having a rim and provided with a central aperture having a backwardly directed tubular neck, means for feeding shells into the machine, means for placing lock springs in said shells, means for folding the rim of the shells inwardly to lock said springs therein, and means for compressing said tubular neck.

4. In a machine of the class described, a main drive shaft, supplemental shafts geared in connection with said main shaft, an intermittently rotated member, means mounted on one of said supplemental shafts for operating said member, a device adapted to feed shells into the machine, a mechanism operated by means of said last named shaft for feeding said shells from said device to said member, means mounted in said member for supporting said shells, means for feeding wire into the machine, means for bending said wire to form U-shaped springs, means for feeding the springs thus formed into said shells, said wire feeding and forming means and spring feeding means being operated by means on the other supplemental shaft, and means for securing the springs in said shells.

5. In a machine of the class described, a frame, a workpiece supporting member mounted therein, means for giving said member an intermittent rotary movement, means for intermittently locking said member against movement, means mounted in said member for supporting workpieces applied thereto, means for feeding workpieces to said supporting means, means for feeding wire into the machine, means for bending said wire to form U-shaped springs, means for feeding the springs thus formed into the workpieces supported by said member, and spinning tools movable toward and from said member and adapted to operate in connection with the workpieces supported thereby to secure said springs therein.

6. In a machine of the class described, a frame, a workpiece supporting member mounted therein, means for giving said member an intermittent rotary movement, means for intermittently locking said member against movement, means mounted in said member for supporting workpieces applied thereto, means for feeding workpieces to said supporting means, means for feeding wire into the machine, means for bending said wire to form U-shaped springs, means for feeding the springs thus formed into the workpieces supported by said member, and spinning tools movable toward and from said member and adapted to operate in connection with the workpieces supported thereby to secure said springs therein, and means for detaching the workpieces with the springs secured therein from said member.

7. In a machine of the class described, a main frame, a power shaft mounted in said frame centrally thereof, supplemental shafts geared in connection with the power shaft, a workpiece supporting member mounted in said frame, means operated by one of said supplemental shafts for giving said member an intermittent rotary movement, spring-controlled means for intermittently locking said member, means for feeding workpieces to said member, means on said last named shaft for operating said work piece feeding means, means in said member for supporting the workpieces fed thereto, means for feeding wire into the machine, means for bending said wire to form U-shaped springs, means for feeding the springs thus formed into the workpieces supported by said member, and spinning devices movable toward and from said member and adapted to operate in connection with the workpieces supported by said member to secure the springs in said workpieces.

8. In a machine of the class described, a frame, a main drive shaft mounted therein centrally thereof, supplemental shafts geared in connection with the main shaft, a workpiece supporting member mounted in said frame and provided with a vertical shaft to the lower end of which is secured a slotted disk, a vertical shaft mounted parallel with said last named shaft and geared in connection with one of said supplemental shafts, means mounted on said last named vertical shaft and adapted to operate in connection with said slotted disk to give said workpiece supporting member an intermittent movement, blocks mounted in said workpiece supporting member, finger pins adjustably mounted in said blocks and adapted to support the workpieces applied to said member, means for operating said blocks to move said pins laterally, standards mounted on said frame at one side of said workpiece supporting member, a workpiece feeding race detachably and movably mounted in said standards, means on the other supplemental shaft for operating said race, a workpiece feeding means mounted between said standards and operated by means on said first named supplemental shaft and adapted to feed workpieces onto the pins in said block, means for feeding wire into the machine, means for bending said wire to form U-shaped springs, means for feeding the springs thus formed into the workpieces supported by the finger pins in said blocks, and means for securing the springs in said workpieces.

9. In a machine of the class described, a frame, a main drive shaft mounted therein centrally thereof, supplemental shafts geared in connection with the main shaft, a workpiece supporting member mounted in said frame and provided with a vertical shaft to the lower end of which is secured a slotted disk, a vertical shaft mounted parallel with said last named shaft and geared in connection with one of said supplemental shafts, means mounted on said last named vertical shaft and adapted to operate in connection with said slotted disk, to give said workpiece supporting member an intermittent movement, blocks mounted in said workpiece supporting member, finger pins adjustably mounted in said blocks and adapted to support the workpieces applied to said member, means for operating said blocks to move said pins laterally, standards mounted on said frame at one side of said workpiece supporting member, a workpiece feeding race detachably and movably mounted in said standards, means on the other supplemental shaft for operating said race, a workpiece feeding means mounted between said standards and operated by means on said first named supplemental shaft and adapted to feed workpieces onto the pins in said blocks, a carriage mounted at right angles to said standards and adapted to move toward and from said workpiece supporting member, means for feeding wire into the inner end of said carriage, and means for bending said wire to form springs, means movably mounted in said carriage for feeding the springs thus formed into the workpieces supported by the finger pins mounted in said blocks, and means for securing the springs in said workpieces.

10. In a machine of the class described, a frame, a main drive shaft mounted therein centrally thereof, supplemental shafts geared in connection with the main shaft, a workpiece supporting member mounted in said frame and provided with a vertical shaft to the lower end of which is secured a slotted disk, a vertical shaft mounted parallel with said last named shaft and geared in connection with one of said supplemental shafts, means mounted on said last named vertical shaft and adapted to operate in connection with said slotted disk to give said workpiece supporting member an intermittent movement, blocks mounted in said workpiece supporting member, finger pins adjustably mounted in said blocks and adapted to support the workpieces applied to said member, means for operating said blocks to move said pins laterally, standards mounted on said frame at one side of said workpiece supporting member, a workpiece feeding race detachably and movably mounted in said standards, means on the other supplemental shaft for operating said race, a workpiece feeding means mounted between said standards and operated by means on said first named supplemental shaft and adapted to feed workpieces onto the pins in said blocks, a carriage mounted at right angles to said standards and adapted to move toward and from said workpiece supporting member, means for feeding wire into the inner end of said carriage, and means for bending said wire to form springs, means movably mounted in said carriage for feeding the springs thus formed into the workpieces supported by the finger pins mounted in said blocks, a carriage mounted at right angles to said first named carriage, means for moving said carriage toward and from the workpiece supporting member, and spinning devices mounted in said carriage and adapted to operate in connection with the workpieces supported by said member.

11. In a machine of the class described, a frame, a main drive shaft mounted therein centrally thereof, supplemental shafts geared in connection with the main shaft, a workpiece supporting member mounted in said frame and provided with a vertical shaft to the lower end of which is secured a slotted disk, a vertical shaft mounted parallel with said last named shaft and geared in connection with one of said supplemental shafts, means mounted on said last named vertical shaft and adapted to operate in connection with said slotted disk to give said workpiece supporting member an intermittent movement, blocks mounted in said workpiece supporting member, finger pins adjustably mounted in said blocks and adapted to support the workpieces applied to said member, means for operating said blocks to move said pins laterally, standards mounted on said frame at one side of said workpiece supporting member, a workpiece feeding race detachably and movably mounted in said standards, means on the other supplemental shaft for operating said race, a workpiece feeding means mounted between said standards and operated by means on said first named supplemental shaft and adapted to feed workpieces onto the pins in said blocks, a carriage mounted at right angles to said standards and adapted to move toward and from said workpiece supporting member, means for feeding wire into the inner end of said carriage, and means for bending said wire to form springs, means movably mounted in said carriage for feeding the springs thus formed into the workpieces supported by the finger pins mounted in said blocks, a carriage mounted at right angles to said first named carriage, means for moving said carriage toward and from the workpiece supporting member, spinning devices mounted in said carriage and adapted to operate in connection with the workpieces supported by said member, and means for detaching the workpieces from said member.

12. In a machine for manufacturing socket members of the class described, comprising originally a shell having a rim and provided with a central aperture having a backwardly directed tubular neck, a workpiece supporting member, means for giving said member an intermittent rotary movement, means for feeding shells to said member, said means serving to crimp the necks of said shells, means for feeding wire into the machine, and means for bending said wire to form U-shaped lock springs, means for feeding the springs thus formed into said shells, and spinning devices for turning the rim portion of said shells inwardly to secure the springs therein.

13. In a machine for manufacturing socket members of the class described, comprising originally a shell having a rim and provided with a central aperture having a backwardly directed tubular neck, a frame, a workpiece supporting member mounted therein, a shell feeding means mounted on said frame and movable toward and from said workpiece supporting member, means for feeding wire into the machine, means for bending the wire to form springs, means for feeding the springs thus formed toward said member, spinning devices mounted on said frame to move toward and from said member, and means for moving said workpiece supporting member intermittently to bring shells supported thereby successively in line with the spring feeding means and the spinning devices.

14. In a machine of the class described, a frame, a workpiece supporting member mounted therein, a workpiece feeding means movable toward and from said member, a spring feeding means movable toward and from said member, and spinning devices movable toward and from said member, and means for giving said workpiece supporting member an intermittent rotary movement whereby a workpiece may be placed thereon and moved successively into line with the spring feeding means and spinning devices.

15. In a machine of the class described, a main frame, a workpiece supporting member mounted therein, means for feeding workpieces to said member, means for feeding wire into the machine, die blocks movable toward and from each other and adapted to operate in connection with the wire fed into the machine to form U-shaped springs therefrom, means for feeding the springs thus formed into the workpieces supported by said member, and means for securing the springs in said workpieces.

16. In a machine of the class described, a frame, a workpiece supporting member mounted therein, blocks mounted in said member, finger pins adjustably mounted in said blocks, means for operating said blocks in planes at right angles to each other to move said finger pins laterally in said member, and means for giving said member an intermittent rotary movement.

17. In a machine of the class described, a frame, a workpiece supporting member mounted therein, blocks mounted in said member, finger pins adjustably mounted in said blocks, means for operating said blocks in planes at right angles to each other to move said finger pins laterally in said member, means for giving said member an intermittent rotary movement, means for feeding workpieces onto said finger pins, and means for feeding springs into the workpieces supported by said finger pins.

18. In a machine of the class described, a frame, a workpiece supporting member mounted therein, blocks movably mounted in said member, finger pins adjustably mounted in said blocks, means for operating said blocks in planes at right angles to each other to project and withdraw said finger pins in said member, means for feeding workpieces onto the finger pins projecting from said member, means for feeding springs into the workpieces supported by the projecting finger pins, and means for operating said workpiece supporting member to bring the finger pins mounted therein successively in line with the workpiece feeding means and the spring feeding means.

19. In a machine of the class described, a frame, a workpiece supporting member mounted therein, blocks movably mounted in said member, finger pins adjustably mounted in said blocks, means for operating said blocks in planes at right angles to each other to project and withdraw said finger pins in said member, means for feeding workpieces onto the finger pins projecting from said member, means for feeding springs into the workpieces supported by the projecting finger pins, means for securing said springs in said workpieces, and means for operating said workpiece supporting member to bring the finger pins mounted therein successively in line with the workpiece feeding means, the spring feeding means and the means for securing the springs in said workpieces.

20. A machine for manufacturing socket members of the class described, comprising originally a shell having a rim and provided with a central aperture having a backwardly directed tubular neck, a frame, a workpiece supporting member mounted therein, a plurality of finger pins mounted in said member, means for operating said pins to project a part thereof beyond said member and the other part thereof being withdrawn within said member, means for feeding a shell onto one of the projecting finger pins, means for moving said member to bring said pin in line with a spring feeding means, means for operating said spring feeding means to insert a spring into the shell supported by said pin, and means for operating said member to bring the shell supported by said pin in line with a spinning device for turning the rim of the shell inwardly to secure said spring therein.

21. In a machine for manufacturing the socket members of a fastening device, of the ball and socket type, said socket members comprising originally a shell having a rim, a race member adapted to supply said shells to the machine, means for feeding said shells from said race member into the machine, means for placing springs in said shells; and means for folding the rim of the shells inwardly to lock said springs therein.

In testimony that I claim the foregoing as my invention I have signed my name in presence of the subscribing witnesses this 23rd day of December, 1916.

DAVIS MARINSKY.

Witnesses:
C. E. MULREANY,
H. C. THOMPSON.